(12) United States Patent
Danilin et al.

(10) Patent No.: US 10,838,836 B1
(45) Date of Patent: Nov. 17, 2020

(54) DATA ACQUISITION AND PROCESSING PLATFORM FOR INTERNET OF THINGS ANALYSIS AND CONTROL

(71) Applicant: AlteroSmart Solutions LTD (Israel), Jerusalem (IL)

(72) Inventors: Alexey Danilin, Jerusalem (IL); Stanislav Danilin, Jerusalem (IL); Kirill Demidov, Jerusalem (IL); Pavel Kovalenko, Jerusalem (IL); Denis Sudakov, Jerusalem (IL); Andrey Suslov, Jerusalem (IL)

(73) Assignee: AlteroSmart Solutions LTD, Jerusalem (IL)

( * ) Notice: Subject to any disclaimer, the term of this patent is extended or adjusted under 35 U.S.C. 154(b) by 0 days.

(21) Appl. No.: 16/879,821

(22) Filed: May 21, 2020

(51) Int. Cl.
| | | |
|---|---|---|
| G06F 15/173 | (2006.01) | |
| G06F 11/30 | (2006.01) | |
| G06F 11/32 | (2006.01) | |
| G06F 16/16 | (2019.01) | |
| G06F 16/2455 | (2019.01) | |
| G06F 9/54 | (2006.01) | |
| G06F 16/182 | (2019.01) | |

(52) U.S. Cl.
CPC .......... G06F 11/3006 (2013.01); G06F 9/546 (2013.01); G06F 11/3013 (2013.01); G06F 11/327 (2013.01); G06F 16/168 (2019.01); G06F 16/182 (2019.01); G06F 16/24568 (2019.01); G06F 2209/544 (2013.01)

(58) Field of Classification Search
CPC .. G06F 11/3006; G06F 16/182; G06F 16/168; G06F 9/546; G06F 11/3013; G06F 11/32; G06F 2209/544
See application file for complete search history.

(56) References Cited

U.S. PATENT DOCUMENTS

| | | | | |
|---|---|---|---|---|
| 10,204,448 | B2 * | 2/2019 | Hazeghi | H05K 7/20409 |
| 10,558,744 | B2 * | 2/2020 | Thomas | H04L 65/4015 |
| 2017/0093700 | A1 * | 3/2017 | Gilley | H04L 63/20 |
| 2017/0311303 | A1 * | 10/2017 | Ahn | H04W 72/0406 |
| 2017/0373952 | A1 * | 12/2017 | Shem Tov | H04L 67/12 |

(Continued)

*Primary Examiner* — Alan S Chou
(74) *Attorney, Agent, or Firm* — Halm M. Factor (57) ABSTRACT

A data acquisition and processing platform system for Industrial Internet of Things (IIoT) analysis and control, the system configured to receive data from a plurality of data sources having data streams with different properties, the system having an architecture comprising a plurality of platform installations, each installation comprising a node, and the system comprising: a data ingestion subsystem having a plurality of data receivers, each of the plurality of data receivers adapted to acquire data from specific data sources; a routing subsystem and a message bus subsystem, the routing and message bus subsystems together forming a communication backbone of the system; a signal identification subsystem, closely interconnected with a data processing subsystem, and configured to form a separate data stream of alarms; and a user interface (UI) backend, configured to provide front-end applications, including information and actionable insights to the end users; wherein the system architecture is scalable and reliable and configured for continuous handling of data streaming from various data sources.

8 Claims, 5 Drawing Sheets

(56) References Cited

U.S. PATENT DOCUMENTS

| | | | |
|---|---|---|---|
| 2018/0299873 A1* | 10/2018 | Chauvet | G05B 19/41865 |
| 2018/0300124 A1* | 10/2018 | Malladi | H04L 12/2823 |
| 2019/0137980 A1* | 5/2019 | Prakash | H04L 41/085 |
| 2020/0196029 A1* | 6/2020 | Bragg | H04L 63/02 |

\* cited by examiner

DATA ACQUISITION AND PROCESSING PLATFORM FOR INTERNET OF THINGS ANALYSIS AND CONTROL

FIELD OF THE INVENTION AND BACKGROUND

Embodiments of the current invention relate to the field of industrial automation processes and control and specifically to data acquisition and processing for internet of things analysis and control.

Handling technological data in industrial automation systems poses specific requirements to data acquisition, quality assurance, distributed storage, and application. Issues of reliability (fault-tolerance), information security, and flexibility are vital in an exemplary system such as power engineering, having even tighter requirements, being one of the most sophisticated industrial systems. Consistent advancement of wide-area monitoring systems (WAMS) has come about to answer the need for high data sampling rates and for source spatial distribution—phasor measurement units (PMU).

Such an approach is in accordance with an Industrial Internet of Things (IIoT) paradigm, which is consistently advanced by the international community of control systems vendors within the Industrial Internet Consortium. (The Industrial Internet Consortium is an open membership organization, formed to accelerate the development, adoption, and widespread use of interconnected machines and devices and intelligent analytics. Location: 109 Highland Avenue, Needham, Mass. 02492, USA).

Another prominent trend is the development of measurement equipment, resulting in steady cost reduction of PMU's, which—together with their obvious advantage compared to traditional measurement systems—facilitates large-scale deployment. For example, most of state-of-art relay protection and automation devices have built-in PMU functions by design. These devices offer an excellent background for extensive evolution of power systems' performance and equipment operation monitoring technologies in terms of accuracy, continuity, and forecasting capabilities.

However, the very large scale of data involved in such systems calls for a platform addressing the challenges of acquisition, analysis, and visualization of measurements obtained from various field devices to be designed in a fully compliant manner with the IIoT paradigm. To achieve the aim, numerous existing as well as front-rank architectures have been analyzed, and widespread and industry-recognized components have been considered with emphasis on open-source solutions.

Currently many companies propose systems and solutions for real-time industrial data collection and analysis. Such companies offering prior art solutions include: OSIsoft LLC (a manufacturer of application software for real-time data management, called the "PI System", founded in 1980, at San Leandro Tech Campus, 1600 Alvarado Street, San Leandro, Calif. 94577, USA); Aspen Technology, Inc. ("AspenTech", a provider of software and services for the process industries, 20 Crosby Drive, Bedford, Mass. 01730, USA); and AVEVA Group plc (a British multinational information technology company, formerly Wonderware's software, at High Cross, Madingley Road, Cambridge, CB3 0HB, UK).

Such systems mostly rely on traditional monolith-type architecture and data handling approaches, which-along with several advantages-suffer from three major drawbacks:

1. system components faults can affect data consistency and reliability of other functions;
2. system scaling requires significant time, effort, and money;
3. system components require high-performance computing systems.

There is therefore a need for a data acquisition and processing platform for IIoT analysis and control, having straightforward scaling, directed to widening the extent of data utilization for end-users through multiple data source ingestion, flexible aggregate processing, with the platform having high reliability and yielding actionable insights.

SUMMARY OF INVENTION

According to the teachings of the current invention, there is provided a data acquisition and processing platform system for Industrial Internet of Things (IIoT) analysis and control, the system configured to receive data from a plurality of data sources having data streams with different properties, the system having an architecture comprising a plurality of platform installations, each installation comprising a node, and the system comprising: a data ingestion subsystem having a plurality of data receivers, each of the plurality of data receivers adapted to acquire data from specific data sources; a routing subsystem and a message bus subsystem, the routing and message bus subsystems together forming a communication backbone of the system; a signal identification subsystem, closely interconnected with a data processing subsystem, and configured to form a separate data stream of alarms; and a user interface (UI) backend, configured to provide front-end applications, including information and actionable insights to the end users; wherein the system architecture is scalable and reliable and configured for continuous handling of data streaming from various data sources. Most preferably, the system further comprises: a configuration management subsystem having a model data management service, configured to provide respective parameter configuration at start-up to the plurality of data receivers; a data exchange subsystem, configured to access data to ensure node-to-node communication, the data exchange subsystem further configured to obtain settings from the configuration management subsystem; a storage subsystem having a plurality of databases into which all data streams are recorded by means of an access layer; a big data storage subsystem, configured to support streaming data archiving with the system; and a long-term analytics subsystem, which includes third party analytics tools and is configured to provide long-term analytics. Typically, the plurality of databases is optimized for types of data, including: model DB for configuration and settings storage; cache for quick read-write operations; and long-term storage for data not accessed in real time, for retrospective analysis. Most typically, the system architecture is a microservice architecture.

Preferably, the data processing subsystem includes a versatile infrastructure based on: a composite message broker; a flexible and adaptable component stack, depending upon a specific implementation task; a plug-and-play capability for data, data sources, analysis algorithms, and storage solutions; and simultaneous handling of numerous data flows, including real-time and historical data. Most preferably, the system architecture is scalable, and fault-tolerant due to state-less implementation, and flexible, having advanced container orchestration technology. Typically, the routing subsystem is configured to deliver at least raw and processed data streams throughout the platform. Most typically, the various data sources include: WAMS; PMU; DFR; SCADA; and IED.

According to the teachings of the current invention, there is further provided a method of using a data acquisition and processing platform system for Industrial Internet of Things (IIoT) analysis and control, the system having an architecture comprising a plurality of platform installations, each installation comprising a node, the method including the steps of: receiving data from a plurality of data sources having data streams with different properties; forming a communication backbone of the system comprising the routing and the message bus subsystems together; closely interconnected a signal identification subsystem with a data processing subsystem, the signal identification subsystem forming a separate data stream of alarms; and providing front-end applications in a user interface (UI) backend including information and actionable insights to the end users; whereby the system architecture is scalable, reliable, and continuously handles data streaming from various data sources. Most preferably, further comprising: providing a configuration management subsystem having a model data management service to provide respective parameter configuration at start-up to the plurality of data receivers; accessing data by a data exchange subsystem to ensure node-to-node communication, the data exchange subsystem further obtaining settings from the configuration management subsystem; providing a storage subsystem having a plurality of data bases into which all data streams are recorded by means of an access layer; supporting streaming data archiving with the system with a big data storage subsystem; and providing long-term analytics using a long-term analytics subsystem, which includes third party analytics tools. Typically, the plurality of databases is optimized for types of data, including: model DB for configuration and settings storage; cache for quick read-write operations; and long-term storage for data not accessed in real time, for retrospective analysis. Most typically, the system architecture is a microservice architecture.

Preferably, the data processing subsystem has a versatile infrastructure based on: a composite message broker; a flexible and adaptable component stack, depending upon a specific implementation task; a plug-and-play capability for data, data sources, analysis algorithms, and storage solutions; and simultaneously handling of numerous data flows, including real-time and historical data. Most preferably, the system architecture is scalable, and fault-tolerant due to state-less implementation, and flexible, having advanced container orchestration technology. Typically, the routing subsystem delivers at least raw and processed data streams throughout the platform. Most typically, the various data sources include: WAMS; PMU; DFR; SCADA; and IED.

LIST OF FIGURES

The invention is described herein, by way of example only, with reference to the accompanying drawings, wherein.

DETAILED DESCRIPTION

Embodiments of the current invention relate to the field of industrial automation processes and control and specifically to data acquisition and processing for internet of things analysis and control. More specifically, embodiments of the current invention comprise a data acquisition and processing platform for IIoT analysis and control, having straightforward scaling, directed to widening the extent of data utilization for end-users through multiple data source ingestion, flexible aggregate processing, with the platform having high reliability and yielding actionable insights.

Figure 1:
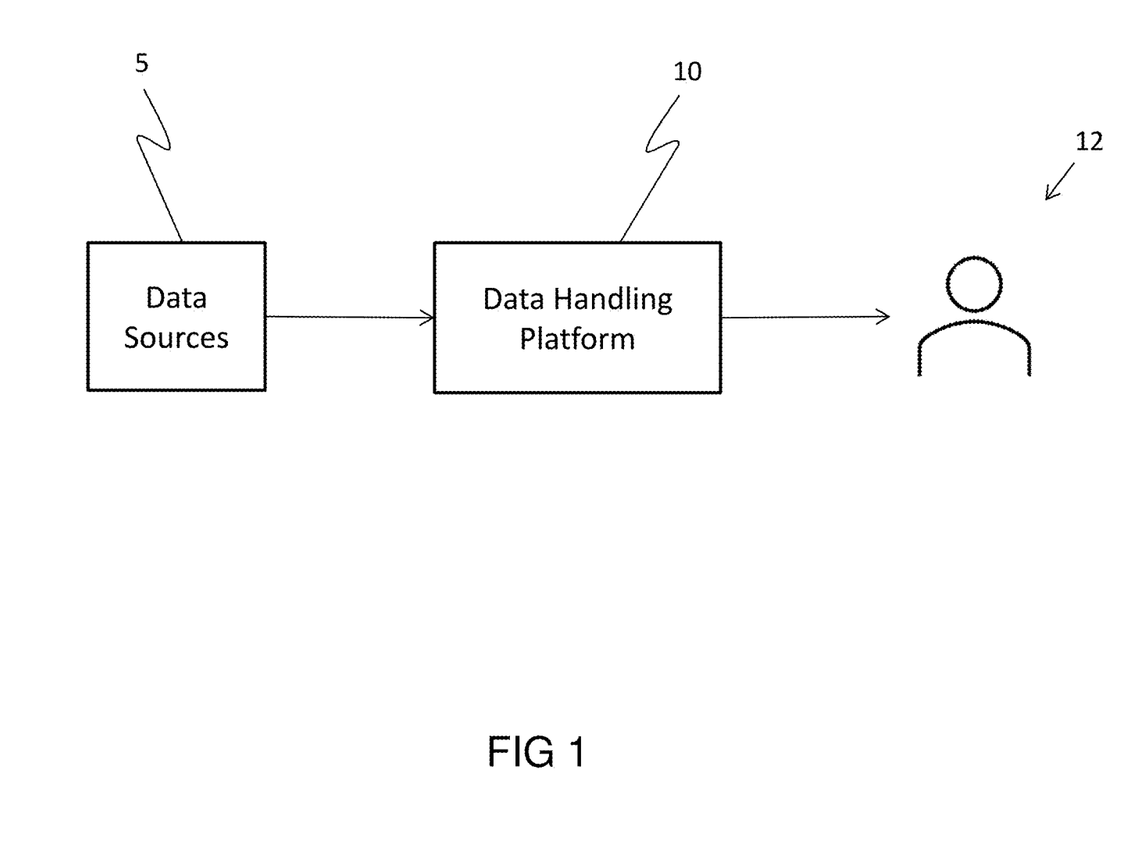
FIG. 1 is an overview block diagram of data sources, a data acquisition and processing platform, and an end user, in accordance with embodiments of the current invention.

Reference is currently made to FIG. 1, which is an overview block diagram of data sources 5, a data acquisition and processing platform 10, and an end user 12, in accordance with embodiments of the current invention. Data sources 5, as described further in detail hereinbelow, include inputs from a wide array of industrial measurement units/devices. End user 12 is a collective term for a plurality of users who derive actionable insights and information from platform 10, such as, but not limited to: visualization, alerting, and decision-making support.

To overcome the drawbacks described hereinabove, embodiments of the current invention include a selection of technologies based upon the most preferable implementation of the data acquisition and processing platform key functions-acquisition, analysis, and visualization of data-taking data properties into account. However, since the data sources typically have/generate data streams having different properties (i.e. visual, analog, differing data rates, etc.), platform flexibility is essential, implying the capability to effectively perform under an array of operating conditions.

The need for a wide range of sources for data ingestion constrains a data ingestion subsystem to support multiple data exchange protocols, for example, as applied to power engineering and other industries. However, it is reasonable to organize independent data ingestion and transfer subsystems, as their application backgrounds may significantly vary with regard to a number of variables, such as, but not limited to: sampling rate; exchange routine; measurement channel number; admissible errors; and delays. Similarly, data analytics can be used to solve diverse problems, differing in a number of variables, such as, but not limited to: required solution cycle; initial data sampling rate; and output format. Hence, data analytics subsystem should generally be implemented as a flexibly configurable environment depending on the objectives and needs of the user.

A similar approach is applied to visualization tools. It is infeasible to provide in advance future requests the data acquisition and processing platform would be expected to meet. Therefore, visualization is also designed to allow for an array of applications, such as, but not limited to: a process engineer tool, a dispatch instrument panel; or an analytical solution incorporating measurements, monitoring, calculations, forecasting-all as described in detail hereinbelow.

Consequently, development of data acquisition and processing platform 10 involves actual trends of cloud technologies application, including private enterprise on-premises clouds, and hybrid environments. Platform architecture is also directed to assure compatibility with Big Data, Business Intelligence (BI), and Machine Learning (ML) components and solutions to handle large volumes of data and implementing functions of retrospective-based decision-making support. Moreover, such systems are directed to provide an interface for existing and to-be-deployed monitoring and control systems integrated with third-party plug-in connections to respond to future challenges.

The architecture of data acquisition and processing platform 10 ensures continuous handling of data streaming from various sources, including but not limited to WAMS (Wide-Are Monitoring/Measuring System) PMU (Phasor Measurement Units), DFR (Digital Fault Recorder), third-party SCADA (Supervisory Control and Data Acquisition) systems and other intelligent electronic devices—as known in the art. The architecture also guarantees and is characterized by fault-tolerance, scalability, and flexibility through utilization of advanced container orchestration technology: Kubernetes (an open-source container-orchestration system for automating application deployment, scaling, and management, originally designed by Google, distributed under Apache License 2.0, and maintained now by the Cloud Native Computing Foundation, at 1 Letterman Drive, Suite D4700, San Francisco, Calif. 94129, USA) for automatic service management.

Additionally, data acquisition and processing platform 10 and/or elements thereof may be spatially distributed, meaning there may be several platform/platform element installations deployed in different locations to achieve consolidated data ingestion, processing, storage, and other functionalities as described hereinbelow. In the specification and claims hereinbelow, the term "node" is intended to mean an individual platform/platform element installation as described above.

Furthermore, the term "system" or "the system", when used in reference to the "data acquisition and processing platform" and/or the term "data acquisition and processing platform system", in the specification and claims which follow, is intended to mean either a singular node/installation or all of the nodes/installations of a complete data acquisition and processing platform.

Figure 2:
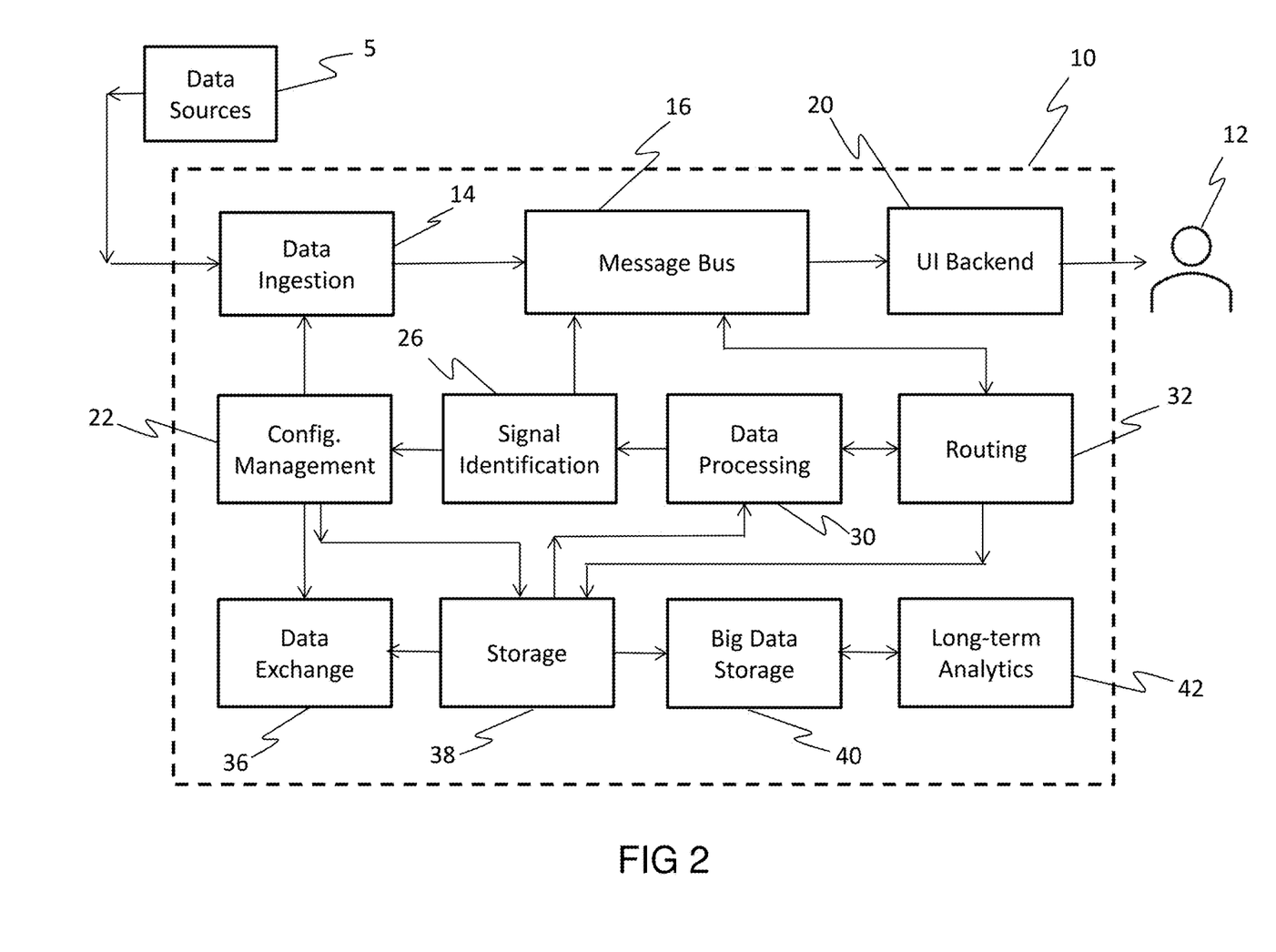
FIGS. 2, 3, and 4 are, respectively, a block diagram of the data sources and the data acquisition and processing platform of FIG. 1, a detailed block diagram of the data sources and a data ingestion module of the data acquisition and processing platform of FIG. 1, and a detailed block diagram of the data acquisition and processing platform of FIG. 1, in accordance with embodiments of the current invention.
Figure 3:
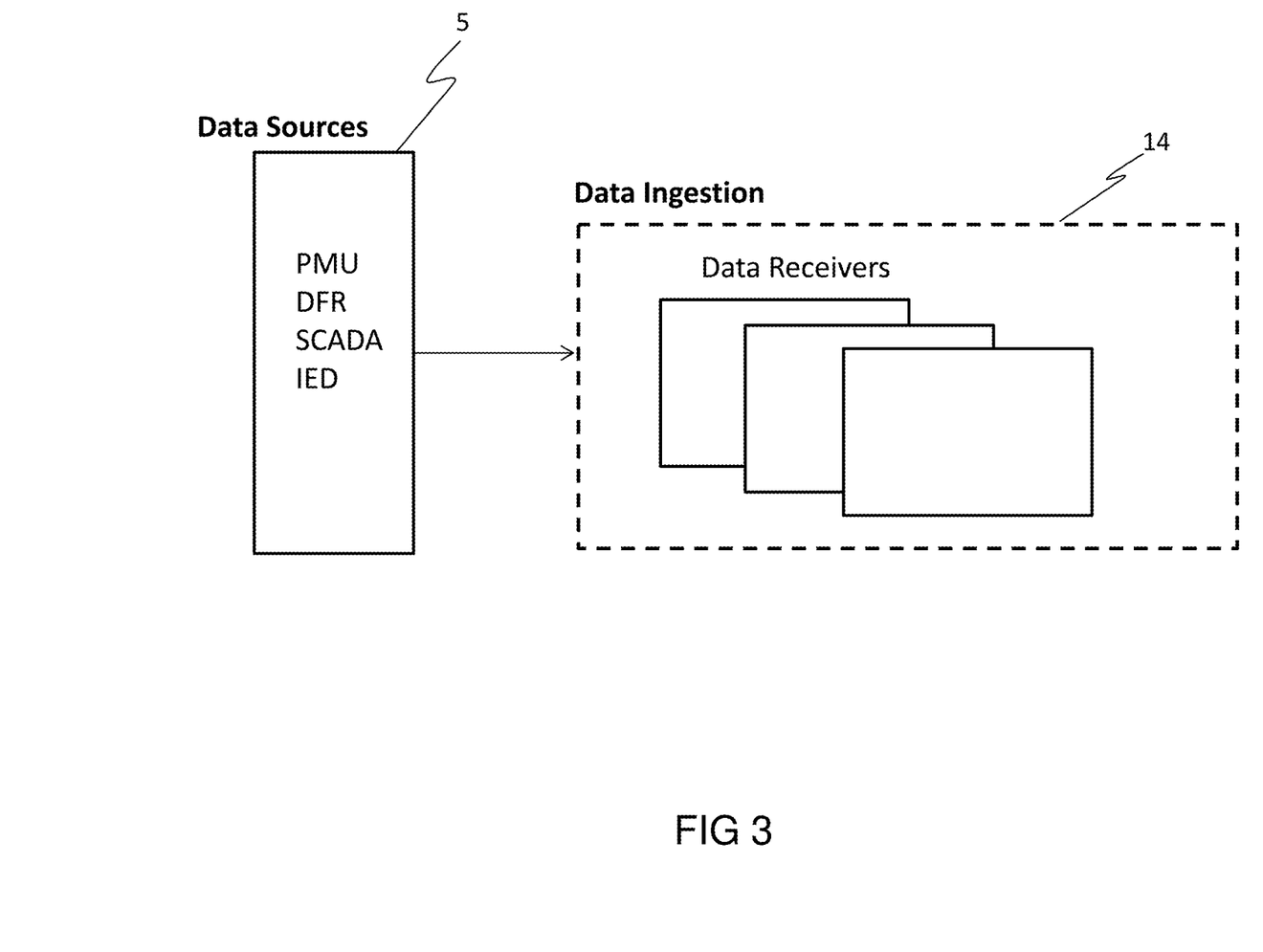
Figure 4:
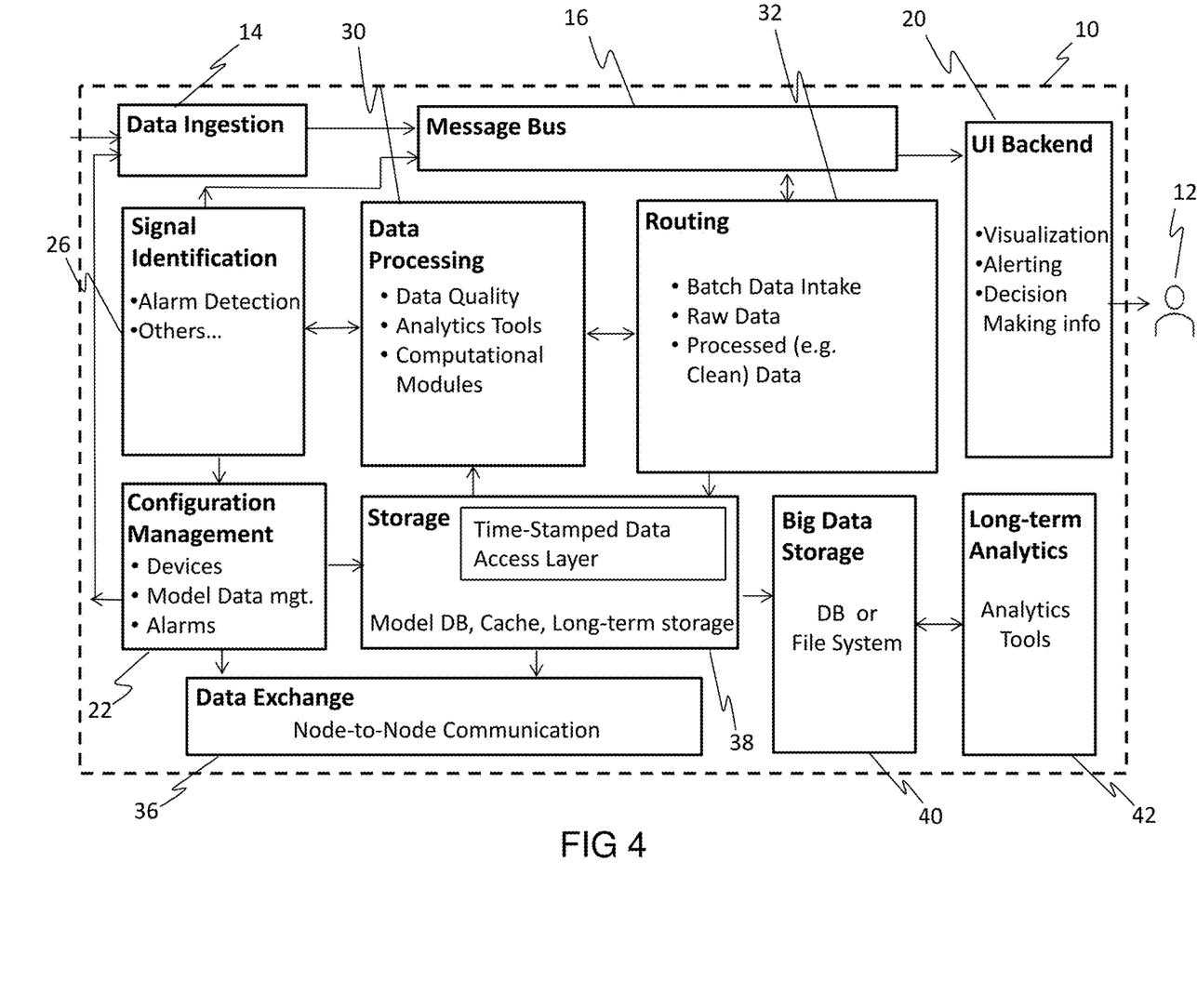

Reference is currently made to FIGS. 2, 3, and 4, which are, respectively, a block diagram of the data sources, the data acquisition and processing platform, and the user of FIG. 1, a detailed block diagram of the data sources and a data ingestion module 14 of the data acquisition and processing platform of FIG. 1, and a detailed block diagram of data acquisition and processing platform 10 and user 12 of FIG. 1, in accordance with embodiments of the current invention.

Data acquisition and processing platform 10 has modules/subsystems including: a Data Ingestion subsystem 14; a Message Bus 16, a UI (User Interface) Backend subsystem 20, a Configuration Management subsystem 22; a Signal Identification subsystem 26, a Data Processing subsystem 30; a Routing subsystem 32; a Data Exchange subsystem 36; a Storage subsystem 38; a Big Data Storage 40; and a Long-Term Analytics subsystem 42.

Data sources 5 include, but are not limited to: PMU, DFR, SCADA (Supervisory Control and Data Acquisition systems), and IED (Intelligent Electronic Device)—all as known in the art. Each of these devices/systems provide data, which is ingested by data ingestion module 14.

Data Ingestion Subsystem

Data Ingestion subsystem 14 provides data acquisition from the data sources. The data Ingestion subsystem is module-based, including a plurality of Data Receivers, each respectively adapted to acquire data from specific data sources. The data receivers are adapted to various operating conditions, related to data transfer, including, but not limited to:

data transfer protocol, including configuration;
connection specifics;
data transfer rate; and
scaling possibility.

These conditions can widely vary, and to achieve optimum flexibility the data receivers are respectively designed for respective data transfer protocols. Therefore, when it is necessary to support a new protocol, overall system adaptation is typically limited to the respective new receiver design.

The Data Receivers obtain respective parameter configuration at start-up from a Model Data Management service, which is part of Configuration Management subsystem 22. The data receivers serve to decode data obtained from the data sources and to repack the data to further transmit the packets to Message bus 16.

Data from the Data sources may be ingested from a plurality of data sources by a plurality of Data Receivers simultaneously, at that there are several options of fault-tolerance and load-balancing assurance, as described hereinbelow.

If a data source supports only a one-client connection, a data load is pre-evaluated to pre-limit necessary resources for a respective data receiver. In case of a specific data receiver failure, the data receiver is automatically restarted. If a specific data source supports data delivery check (e.g., using TCP), data is retransmitted, and the data consistency is assured.

In case a specific data source supports multiple client connections, a plurality of data receiver instances may acquire the data source data with the load automatically balanced between the plurality of data receivers. In case of one or several data receiver instances failure, data flow is redirected to the operational data receivers. After repair/restoration of a data receiver failure, data load is redistributed evenly—and data consistency is assured.

Other subsystems and modules are as described in more detail hereinbelow. In general, Routing subsystem 32 together with Message bus subsystem 32 form a platform communication backbone and characterize the platform's architectural nature, namely: flexibility, scalability, and fault-tolerance, due to state-less implementation if possible.

Message Bus

Message Bus 16 is a stem-forming part of data acquisition and processing platform 10, and in conjunction with Routing subsystem 32 serves to deliver data throughout the platform. While the flow of data within the platform may be complex—depending on the nature of the data—Routing subsystem 32 generally provides at least two data streams: raw data and processed data.

Data packets from Data ingestion subsystem 14 are transferred to the Message Bus, also referred hereinbelow as simply "Bus". UI Backend 20, however, receives data packets directly from the Bus according to the pub/sub (publish-subscribe) model, as known in the art.

The Bus can be horizontally scaled for both load balancing and fault-tolerance assurance. The following components may be used in the capacity of Bus:

RabbitMQ (An open-source message-broker software (sometimes called message-oriented middleware) supplied under Mozilla Public License by VMware Tanzu, former Pivotal Software, located at 875 Howard Street, Fifth Floor, San Francisco, Calif. 94103);

NATS (An open-source messaging system (sometimes called message-oriented middleware) written in the Go programming language. Supplied under Apache License 2.0 by Synadia Communications, Inc., located at 10250 Constellation Boulevard, Los Angeles, Calif. 90067).

Data Processing

Data processing is performed within Data Processing subsystem 30 and includes but is not limited to: data quality assurance (missing data and outliers detection/restoration) and other analytical tools and computational modules. Signal Identification subsystem 26 is closely interconnected with the Data Processing subsystem to form a separate data stream of alarms.

Virtually all data streams are routed to UI Backend 20 to provide front-end application such as, but not limited to: Visualization; Alarming; and Decision-Making information to end user 12 (i.e. "users"). All data streams are additionally recorded by means of an Access Layer into several data bases which form Storage subsystem 38.

Platform Architecture

The architecture of the platform, based on separate independent services, is commonly referred to as "microservice architecture", which implies that services address their respective tasks, themselves. However, delivering data/information necessary for respective services' tasks and obtaining reliable responses on time is most challenging.

The unique features of the data acquisition and processing platform stem not only from the adoption of microservice architecture, but also from the development of a highly versatile infrastructure based on a composite message broker formed by methods of applying the Message bus and the Routing, as follows:
 1. flexible component stack, which can be adapted depending upon specific implementation tasks;
 2. plug-and-play capability for various data: sources; analysis algorithms; and storage solutions;
 3. simultaneous handling of numerous data flows, including real-time and historical data;
 4. scalability and fault-tolerance through automatic service and resource management; and
 5. external system integration compatibility.

Routing Subsystem

Routing subsystem 32 acquires raw data packets as batches from the Bus and directs them to the Data Processing subsystem, in case it requires raw data. For example, an application of Data Processing 30 is data quality assurance. The data quality assurance application is responsible for transmitting processed data packets back to Routing subsystem 32, from where so-called "clean data" (i.e. data checked for missing parts, outliers, etc. and repaired if necessary) is forwarded to the Storage 38 in parallel with raw data packets. The processed data is sent back to Message Bus 16 and then forwarded to the UI Backend subsystem.

Various business tasks can be solved within Data Processing 30, based on the data received from Routing 32 and Storage 38. Most of the analysis in the Data Processing subsystem is performed by separate computational modules operating as state-less services. An example is data quality assurance, which serves to receive raw data and to detect measurement errors and missing measurement points to restore them, if possible. Output of the data quality assurance (and of the Data Processing subsystem) is processed/clean data, which is directed to Signal Identification subsystem 26 and back to Routing 32. Raw data streams also can be throughput to the Signal Identification subsystem.

In Data Processing subsystem 30, along with modules operating on a real-time basis, there may be analytical tools serving to retrieve historical data periodically, upon manual request or based on an alarm-generated trigger, etc. The data stream results are distributed between Signal Identification subsystem 26 for Alarm Detection and Routing 32 for Storage 38, if necessary.

The advantage of the microservice architecture of the Data Processing is that analytical modules are independent of one another, with each module being scalable and fault tolerant, as necessary. Similar to the case of Data Ingestion 14, any new data analysis task solution is limited to a new module development without the entire platform being affected.

Signal Identification Subsystem

As noted hereinabove, Signal Identification 26 serves to detect alarms based on data obtained from Data Processing 30 and from Configuration Management 22. Results are forwarded to the Message Bus for quick propagation to UI Backend 20. Although alarm detection is closely interconnected with the Data Processing, alarm detection is implemented as a separate subsystem due to its critical role in the platform. Several alarm detection instances may operate simultaneously, handling streams of processed data and raw data with redundancy-based fault-tolerance.

UI Backend

The UI Backend serves to address the tasks of visualization, alerting and decision-making support/information. UI Backend 20 receives data packets from Message Bus 16.

Visualization, alerting and decision-making support tools can differ depending upon specific implementation tasks. However, the corresponding functionality of these tools may be performed by third-party solutions, such as, but not limited to: web-browsers; hardware display systems; notification services; and human-machine interface devices connecting to the UI Backend using WebSocket—a communications protocol providing full-duplex communication over a single TCP connection, as known in the art.

Configuration Management

Configuration Management 22 manages all model-related data, including but not limited to: topology, configuration, alarms, etc. All settings are stored in a Model DB module in Storage 38, with all other subsystems accessing it through the Configuration Management subsystem. This solution is defined by the necessity to implement state-less subsystems and services to provide for their scalability, meaning Configuration Management 22 can be horizontally scaled both for load balancing and fault-tolerance.

Storage Subsystem

Storage 38 includes several types of databases optimized for various types of data, such as, but not limited to: Model DB (database) for configuration and settings storage; Cache for quick read-write operations; and Long-term storage for storing data, which is not necessarily accessed in real-time, but should be available for retrospective analysis.

Cache and Long-term storage are accessed through an Access Layer module, while Model DB is accessed by Configuration Management 22 directly. The Access Layer receives and regulates read and write requests from Routing 32 and from Data Processing 30 to optimize respective loads and response times of the databases.

All Storage databases are selected to respond to specific demands of data storage, depending upon the data nature, be it continuously streaming high sampling rate data—which needs to be quickly written using disk space saving technology—or data which is often retrieved in bulk from Storage 38 for analytic tasks. The databases support horizontal scaling for load balancing and fault-tolerance assurance, including spatially distributed implementation.

The following are examples of components that can be integrated into Storage subsystem 38:

Model DB—PostgreSQL (Also known as Postgres, is a free and open-source relational database management system emphasizing extensibility and SQL compliance, supplied under PostgreSQL License by PostgreSQL Global Development Group (ref: https://www.postgresql.org/community/contributors/)

Cache—Redis (An in-memory data structure project implementing a distributed, in-memory key-value database with optional durability, supplied under BSD 3-clause License by Redis Labs, located at 700 E El Camino Real Suite 250, Mountain View, Calif. 94040)

Long-term storage:

InfluxDB (An open-source time series database, written in Go and optimized for fast, high-availability storage and retrieval of time series data, supplied under MIT License by InfluxData, located at 799 Market Street, Suite 400, San Francisco, Calif. 94103)

TimescaleDB (An open-source time series database optimized for complex queries, supplied under Apache License 2.0 by Timescale, located at 335 Madison Ave, Floor 5, New York, N.Y. 10017), etc.

Data Exchange Subsystem

Data Exchange 36 provides communication between platform nodes. The Data Exchange obtains settings from the Configuration Management subsystem 22 and data is received from Storage 38.

The Data Exchange subsystem is responsible for the possibility of the platform distributed deployment with data being safely stored over numerous nodes with provision for redundant replication and restoration in case of fault.

Big Data Storage and Long-Term Analytics Subsystems

Data acquisition and processing platform 10 is fully compatible with Big Data 40 storage and analysis technologies through corresponding subsystems. Data for any specific application can be retrieved from Storage 38 upon request, including configuration information, raw or processed data, signals, etc. The platform also supports streaming data archiving to Big Data storage 40, which enables use of corresponding third-party analytics tools as part of the Long-term Analytics subsystem 42.

The following are examples of the components that can be used for the Big Data storage and Long-term Analytics subsystems:

DB or File System—Hive (A data warehouse software project built on top of Apache Hadoop for providing data query and analysis, supplied under Apache License 2.0 by Apache Software Foundation, located at 401 Edgewater Place, Suite 600, Wakefield, Mass. 01880) or HDFS (A distributed file-system that stores data on commodity machines, providing very high aggregate bandwidth across the cluster, supplied under Apache License 2.0 by Apache Software Foundation, located at 401 Edgewater Place, Suite 600, Wakefield, Mass. 01880).

Analytics tools—Spark (An open-source distributed general-purpose cluster-computing framework, providing an interface for programming entire clusters with implicit data parallelism and fault tolerance, supplied under Apache License 2.0 by Apache Software Foundation, located at 401 Edgewater Place, Suite 600, Wakefield, Mass. 01880).

Exemplary Implementation

Figure 5:
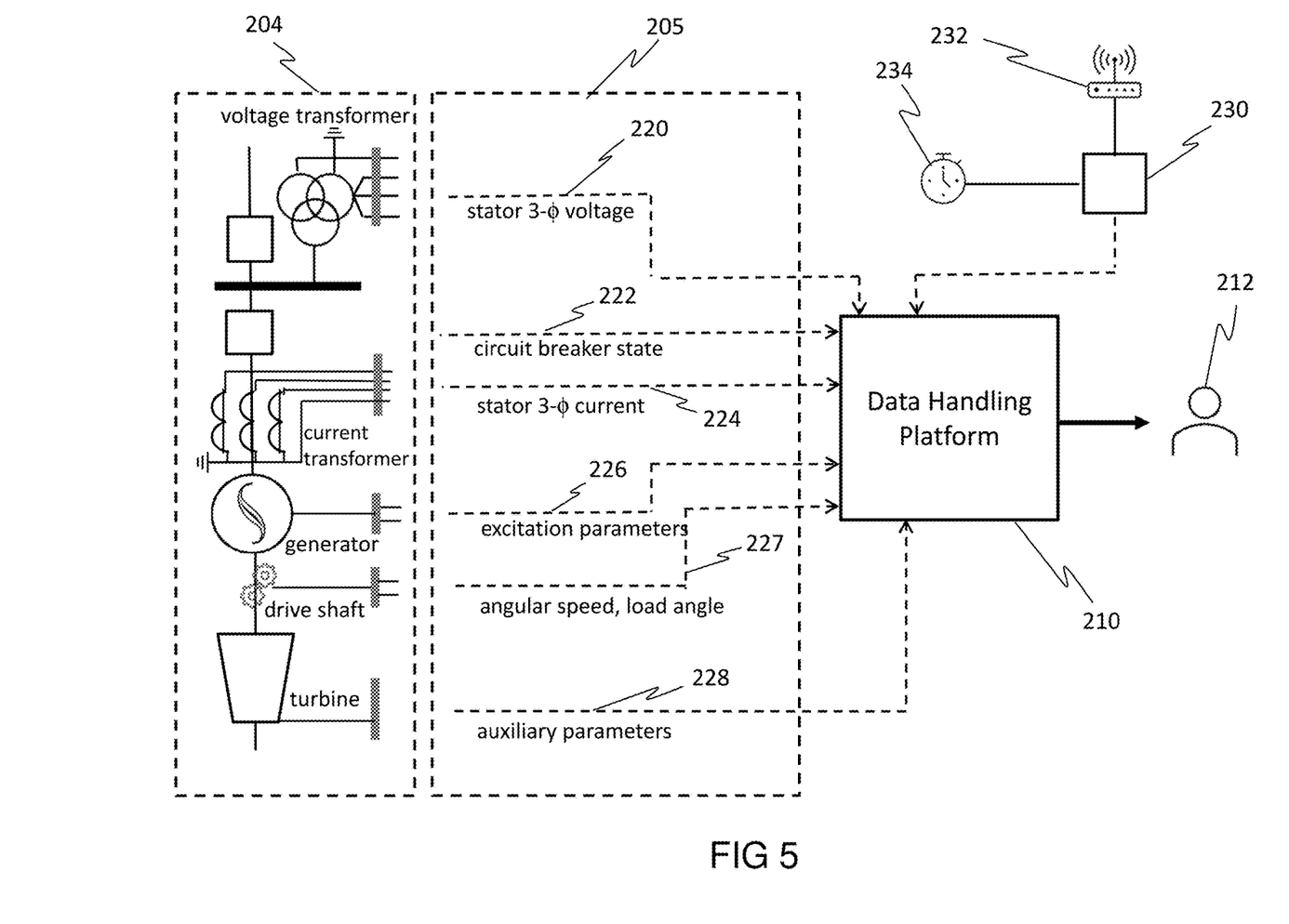
FIG. 5 is a schematic block diagram of an exemplary implementation at a generating unit of a power plant, yielding data sources, for a data acquisition and processing platform and for an end user, in accordance with embodiments of the current invention.

Reference is currently made to FIG. 5, which is a schematic block diagram of an exemplary implementation at a generating unit of a power plant 204, having data sources 205, and a data acquisition and processing platform 210 and for an end user 212, in accordance with embodiments of the current invention.

Apart from differences described below, data sources 5 of FIGS. 1-4 and data acquisition and processing platform 10 and end user 12 of FIGS. 1, 2, and 4, are identical in notation, configuration, and functionality to that shown, respectively, for data sources 205, data acquisition and processing platform 210, and end user 212 of FIG. 5. It is to be understood that elements/subsystems of data acquisition and processing platform 10 and of data acquisition and processing platform 210 and that end user 12 (FIGS. 1-4) and end user 212 of FIG. 5 are generally identical in configuration, operation, and functionality as described hereinabove.

Generator unit of power plant 204 includes a number of systems/subsystems including, but not limited to: turbine; drive shaft; generator; and current and voltage transformers. As part of typical control and monitoring the generating unit of the power plant, these systems/subsystems provide data sources 205, which may be categorized according to:

electrical parameters—such as, but not limited to: stator voltage and current; and excitation voltage and current;

discrete signals received from various equipment—such as, but not limited to: state of circuit breakers; and state of auxiliary pumps and valves;

mechanical parameters obtained through additional equipment—such as, but not limited to: gear wheel angular speed; and rotor position;

other parameters of various auxiliary equipment and systems—such as, but not limited to: boilers and piping temperature and pressure; fuel consumption; and vibrations;

external testing or inspection data—such as, but not limited to: infrared inspections, ultraviolet inspections, and insulation testing results, etc.

Data sources 205 are represented schematically in FIG. 5 including, but not limited to: stator 3-phase voltage 220; circuit breaker state(s) 222; stator 3-phase current 224; generator excitation parameters 226; drive shaft angular speed and load angle 227; and turbine auxiliary parameters 228—all of which are ingested into the data acquisition and processing platform.

With versatile intake capabilities, data quality assurance, and services fault-tolerance, the data acquisition and processing platform ensures data consistency and aggregated utilization. Inclusion of all available data sources allows extended analytics and diagnostics for the benefit of the end-user—all as described hereinabove.

A time-synchronization module 230—which is not part of the data handling platform—serves to time-stamp individual data samples of respective data streams of data sources 205, in addition to any time-stamp information received from data sources 205. Time-synchronization module 230 is typically a third-party device and is typically fed by an external satellite navigation receiver (i.e. GPS/Glonass/Bei Dou, as known in the art), which provides a precise timestamp value to the time-synchronization module, and by an additional time source 234, typically obtained from the network (i.e. PTP time server, as known in the art). As described hereinabove (ref FIG. 3) separate data receivers allow ingestion of data from a wide variety of data sources, which are flexibly adjusted with regard to network/physical interconnection, sampling rate, accuracy conditions, etc.

The following are examples of visualization, alerting, and decision-making information afforded end user 212 for typical control and monitoring of generating unit of a power plant 204.

A load angle, derived within the Data Processing subsystem (FIGS. 2 and 4) is a key synchronous machine operation parameter, bringing deep insight into processes taking place in a generator. For example, the load angle is used in combination with the excitation parameters to assess the machine damping properties to develop control system actions.

A procedure for validating generator model parameters is required by power plant system operators. The procedure incorporates parameters generally affected by power plant operation conditions, wear, etc. By serving to connect all data sources data acquisition and processing platform 210, affords a complete picture of the equipment operation to be obtained.

Circuit breakers abnormal operation is driven by various conditions/situations, which may threaten basic equipment and which should be detected as early as possible. High resolution measurements (inferring high volume of data) allow detection of some anomalies much earlier than conventional diagnostics systems.

It will be appreciated that the above descriptions are intended only to serve as examples, and that many other embodiments are possible within the scope of the present invention as defined in the appended claims.

The invention claimed is:

1. A data acquisition and processing platform system for Industrial Internet of Things (IIoT) analysis and control, the system configured to receive data from a plurality of data sources having data streams with different properties, the system having a microservice, fault tolerant, and scalable architecture comprising a plurality of platform installations, each installation comprising a node, and the system comprising:
   a data ingestion subsystem having a plurality of data receivers, each of the plurality of data receivers adapted to acquire data from specific data sources, the data sources including: WAMS; PMU; DFR; SCADA; and IED;
   a routing subsystem configured to manage data streams and a message bus subsystem horizontally-scaled for both load balancing and fault-tolerance assurance, the message bus selected from a range of third-party components;
   a signal identification subsystem, closely interconnected with a data processing subsystem, and configured to form a separate data stream of alarms; and
   a user interface (UI) backend, configured to provide front-end applications, including information and actionable insights to the end users; wherein the system architecture is scalable and reliable and configured for continuous handling of data streaming from various data sources;
   the system further including a versatile infrastructure based on:
      a composite message broker;
      a flexible and adaptable component stack, depending upon a specific implementation task; and
      the system further configured to ensure:
      a plug-and-play capability for data, data sources, analysis algorithms, and storage solutions; and
      a simultaneous handling of numerous data flows, including real-time and historical data.

2. The system of claim 1, wherein the system further comprises:
   a configuration management subsystem having a model data management service, configured to provide respective parameter configuration at start-up to the plurality of data receivers;
   a data exchange subsystem, configured to access data to ensure node-to-node communication, the data exchange subsystem further configured to obtain settings from the configuration management subsystem;
   a storage subsystem having a plurality of databases into which all data streams are recorded by means of an access layer;
   a big data storage subsystem, configured to support streaming data archiving with the system; and
   a long-term analytics subsystem, which includes third party analytics tools and is configured to provide long-term analytics.

3. The system of claim 2, wherein the plurality of databases is optimized for types of data, including: model DB for configuration and settings storage; cache for quick read-write operations; and long-term storage for data not accessed in real time, for retrospective analysis.

4. The system of claim 3, wherein the routing subsystem is configured to deliver at least raw and processed data streams throughout the platform.

5. A method of using a data acquisition and processing platform system for Industrial Internet of Things (IIoT) analysis and control, the system having a microservice, fault tolerant, and scalable architecture comprising a plurality of platform installations, each installation comprising a node, the method including the steps of:
   a. receiving data from a plurality of data sources including: WAMS; PMU; DFR; SCADA; and IED; and having data streams with different properties;
   b. forming a communication backbone of the system comprising a routing subsystem, configured to manage data streams and a message bus subsystem horizontally-scaled for both load balancing and fault-tolerance assurance, the message bus selected from a range a third-party components;
   c. closely interconnected a signal identification subsystem with a data processing subsystem, the signal identification subsystem forming a separate data stream of alarms; and
      providing front-end applications in a user interface (UI) backend including information and actionable insights to the end users;
   whereby the system architecture is scalable, reliable, and continuously handles data streaming from various data sources;
      the system further including a versatile infrastructure based on:
      a composite message broker;
      a flexible and adaptable component stack, depending upon a specific implementation task; and
      the system further configured to ensure:
      a plug-and-play capability for data, data sources, analysis algorithms, and storage solutions; and
      a simultaneous handling of numerous data flows, including real-time and historical data.

6. The method of claim 5, further comprising:
   providing a configuration management subsystem having a model data management service to provide respective parameter configuration at start-up to the plurality of data receivers;

accessing data by a data exchange subsystem to ensure node-to-node communication, the data exchange subsystem further obtaining settings from the configuration management subsystem;

providing a storage subsystem having a plurality of data bases into which all data streams are recorded by means of an access layer;

supporting streaming data archiving with the system with a big data storage subsystem; and providing long-term analytics using a long-term analytics subsystem, which includes third party analytics tools.

7. The method of claim 6, whereby the plurality of databases is optimized for types of data, including: model DB for configuration and settings storage; cache for quick read-write operations; and long-term storage for data not accessed in real time, for retrospective analysis.

8. The method of claim 7, whereby the routing subsystem delivers at least raw and processed data streams throughout the platform.

* * * * *